(12) United States Patent
Lee

(10) Patent No.: US 6,325,135 B1
(45) Date of Patent: Dec. 4, 2001

(54) COLLAPSIBLE DOOR ASSEMBLY FOR A BATHROOM

(76) Inventor: Chen Hsiang Lee, Suite 1, No. 10, Lane 73, Chung-Chien, Road, Hsiao-Kang, Kaohsiung (TW)

( * ) Notice: Subject to any disclaimer, the term of this patent is extended or adjusted under 35 U.S.C. 154(b) by 0 days.

(21) Appl. No.: 09/503,270

(22) Filed: Feb. 14, 2000

(51) Int. Cl.[7] .................................................. E05D 15/26
(52) U.S. Cl. .................... 160/199; 160/201; 160/213; 160/229.1; 49/212
(58) Field of Search ........................ 160/40, 187, 188, 160/195, 201, 206, 213, 199, 223, 229.1, 236; 49/212, 223, 225, 360, 383, 505

(56) References Cited

U.S. PATENT DOCUMENTS

| | | | |
|---|---|---|---|
| 2,351,656 | * 6/1944 | Auten | 160/199 |
| 3,359,594 | * 12/1967 | Pastoor | 160/199 |
| 3,703,061 | * 11/1972 | Holland et al. | 160/201 |
| 3,799,237 | * 3/1974 | Proserpi | 160/199 |
| 3,906,668 | * 9/1975 | Simmons | 49/212 |
| 4,644,992 | * 2/1987 | Jerila | 160/213 |
| 4,921,033 | * 5/1990 | Finch et al. | 160/133 |
| 4,981,164 | * 1/1991 | Reichel | 160/187 |
| 5,099,903 | * 3/1992 | Chen | 160/199 |
| 5,141,043 | * 8/1992 | Kraeutler | 160/264 |
| 5,204,147 | * 4/1993 | Schneider | 160/201 X |
| 5,832,980 | * 10/1998 | Cianciolo | 160/197 |
| 5,909,762 | * 6/1999 | Denoual et al. | 160/201 |
| 5,918,659 | * 7/1999 | Lee | 160/199 |

* cited by examiner

Primary Examiner—Bruce A. Lev
(74) Attorney, Agent, or Firm—Alan Kamrath; Rider, Bennett, Egan & Arundel, LLP

(57) ABSTRACT

A collapsible door assembly includes first and second jambs secured to two opposite walls. A fixing strip is secured to the first jamb. A first track-fixing member is mounted on an end of the first jamb. A second track-fixing member is mounted on an end of the second jamb. A track is securely mounted between the first track-fixing member and the second track-fixing member. A number of door leaves are mounted between the fixing strip and the second jamb. Each two adjacent door leaves are pivotable one relative to the other. Each door leaf includes a first end section and a second end section, the first end section including a swirl portion, the second end section of each door leaf being configured to be pivotally coupled with the swirl portion of an adjacent door leaf. The first end section of one of two outermost door leaves is pivotally connected with the fixing strip. A slide member includes a first end securely attached to each even-numbered joint of each two adjacent door leaves counting from the one of two outermost door leaves. The slide member further includes a second end slidably received in the track.

20 Claims, 7 Drawing Sheets

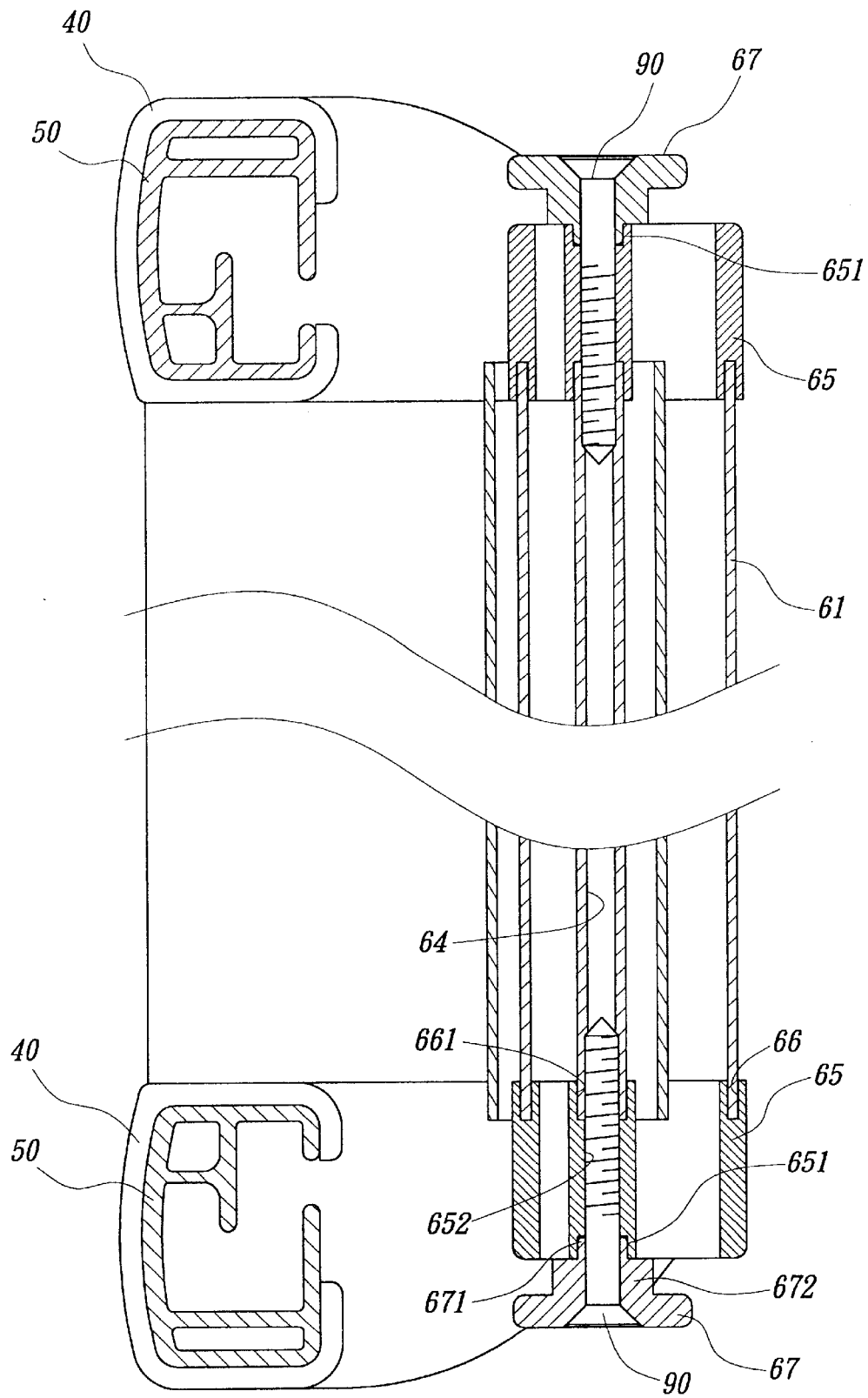
F I G. 5

COLLAPSIBLE DOOR ASSEMBLY FOR A BATHROOM

BACKGROUND OF THE INVENTION

1. Field of the Invention

The present invention relates to a collapsible door assembly for a bathroom that provides utility as well as aesthetically pleasing effect.

2. Description of the Related Art

A typical collapsible door assembly for a bathroom includes a plurality of door leaves that are suspended in a manner so as to be slidable along a track. The door leaves are mounted one by one and each two adjacent door leaves are interconnected by a connecting plate that is substantially T-shape in section, thereby allowing the door leaves to be collapsed.

Lamp is often mounted outside the shower space in the bathroom, as the moisture content in the shower space is relatively high. Hence, the door leaves are generally made of translucent material to allow light from the lamp to be transmitted therethrough into the shower space for illumination. However, image of the overlapped portion of the translucent door leaves and the connecting plates renders an aesthetically unpleasing effect. This might adversely affect the mood of the user that is taking shower.

SUMMARY OF THE INVENTION

It is a primary object of the present invention to provide a collapsible door assembly for a bathroom that provides aesthetically pleasing effect in addition to utility.

In accordance with a first aspect of the invention, a collapsible door assembly adapted to be mounted between two opposite walls comprises:

a first jamb adapted to be secured to one of the opposite walls, a fixing strip secured to the first jamb, a second jamb adapted to be secured to the other opposite wall, a first track-fixing member mounted on an end of the first jamb, a second track-fixing member mounted on an end of the second jamb, a track securely mounted between the first track-fixing member and the second track-fixing member, a plurality of door leaves mounted between the fixing strip and the second jamb, each two adjacent said door leaves being pivotable one relative to the other, each said door leaf including a first end section and a second end section, the first end section including a swirl portion, the second end section of each said door leaf being configured to be pivotally coupled with the swirl portion of an adjacent said door leaf, the first end section of one of two outermost door leaves being pivotally connected with the fixing strip, and a slide member including a first end securely attached to each even-numbered joint of each two adjacent said door leaves counting from said one of two outermost door leaves, the slide member further including a second end slidably received in the track.

In an embodiment of the invention, a locking plate has a first end connected to the second end section of the other outermost door leaf. A locking strip is securely mounted to the second jamb and includes an engaging groove configured for releasably engaging with a second end of the locking plate. The locking plate may include two handles respectively attached to two sides thereof. In addition, a slide member is attached to the locking plate and includes an end slidably received in the track.

A door leaf cap is mounted on an end of the joint of two adjacent door leaves. The door leaf cap includes a receptacle for receiving the end of the joint. The receptacle includes an innermost end for receiving an innermost end of the swirl portion. The swirl portion includes a through-hole in the innermost end thereof. The door leaf cap includes a through-hole having an inner end communicated with the innermost end of the receptacle. The through-hole of the door leaf cap further includes an outer end with a countersink. A positioning member is mounted outside the door leaf cap. A fastener is extended through the positioning member into the through-hole of the innermost end of the swirl portion. The positioning member includes a flange that is snugly received in the countersink to provide a positioning effect. The first end of each slide member includes a hole through which an associated positioning member is extended.

In accordance with a second aspect of the invention, a collapsible door assembly adapted to be mounted between two opposite walls comprises:

a first jamb adapted to be secured to one of the opposite walls, a fixing strip secured to the first jamb, a second jamb adapted to be secured to the other opposite wall, a locking strip secured to the second jamb, two first track-fixing members mounted on top of the first jamb and top of the second jamb, respectively, two second track-fixing members mounted to a bottom of the first jamb and a bottom of the second jamb, an upper track securely mounted between the first track-fixing members, a lower track securely mounted between the second track-fixing members, a locking plate including a first end and a second end, a plurality of door leaves mounted between the fixing strip and the locking strip, each two adjacent said door leaves being pivotable one relative to the other, each said door leaf including a first end section and a second end section, the first end section including a swirl portion, the second end section of each said door leaf being configured to be pivotally coupled with the swirl portion of an adjacent said door leaf, the first end section of one of two outermost door leaves being pivotally connected with the fixing strip, the second end section of the other outermost door leaf being connected to the first end of the locking plate, an upper slide member including a first end securely attached an upper end of each even-numbered joint of each two adjacent said door leaves, each said upper slide member further including a second end slidably received in the upper track, and a lower slide member including a first end securely attached a lower end of said each even-numbered joint of each two adjacent said door leaves, each said lower slide member further including a second end slidably received in the lower track.

The door assembly may be installed in a bathroom and may be in a fully extended status or a collapsed status. The door leaves are made of transparent or translucent material such that the light from a lamp may be transmitted into a shower space of a bathroom in which the collapsible door assembly in accordance with the present invention is installed. Connecting plates of different material and/or color required in conventional bathroom collapsible door assembly are not used in the collapsible door assembly in accordance with the present invention. Thus, the person may take a shower in a good mood, as an aesthetically pleasing effect can be obtained.

Other objects, advantages, and novel features of the invention will become more apparent from the following detailed description when taken in conjunction with the accompanying drawings.

BRIEF DESCRIPTION OF THE DRAWINGS

FIG. 5 is a sectional view taken along line 5—5 in FIG. 3.

Detailed Description of the Preferred Embodiment

Figure 1:
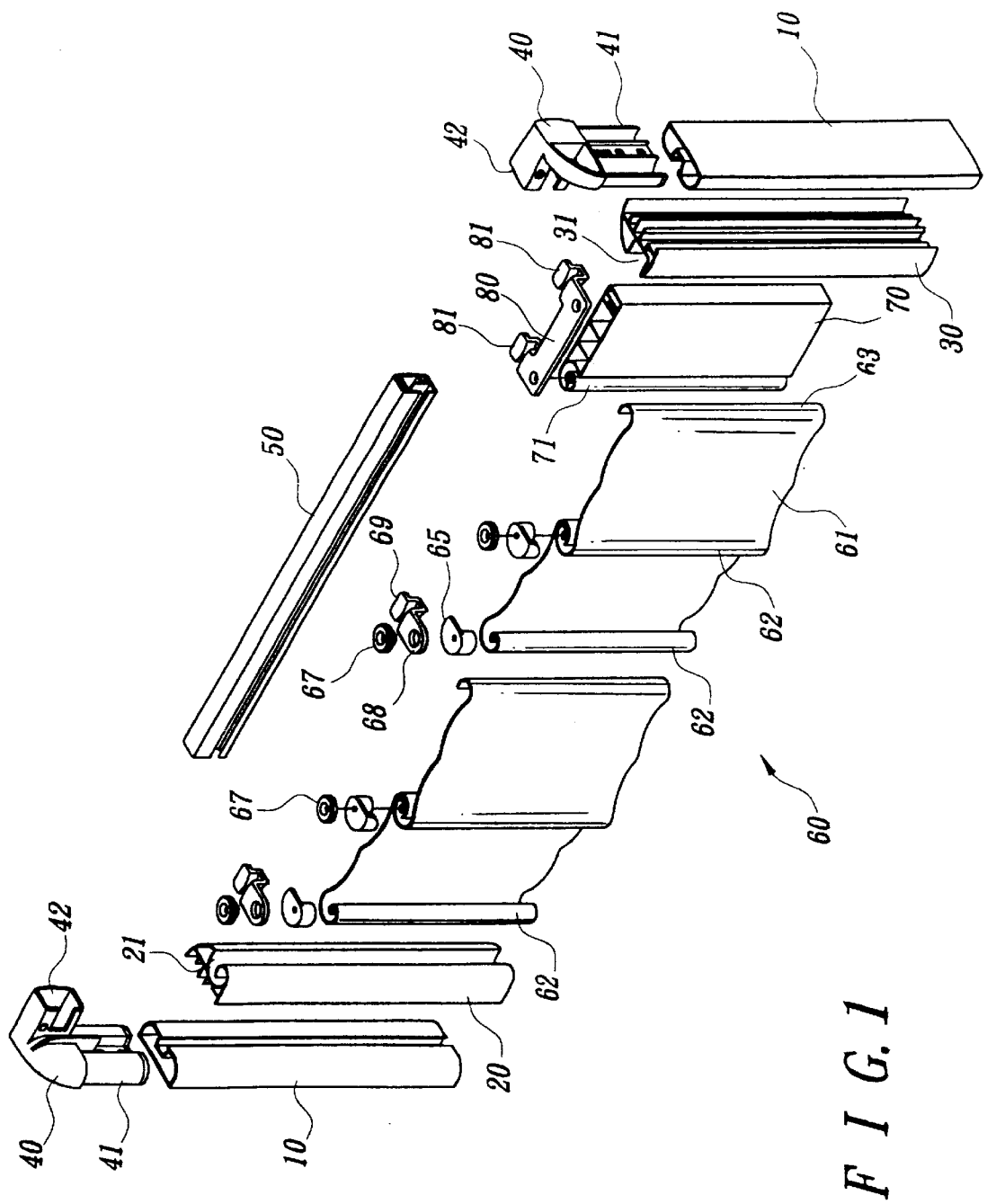
FIG. 1 is an exploded perspective view of a collapsible door assembly in accordance with the present invention.
Figure 2:
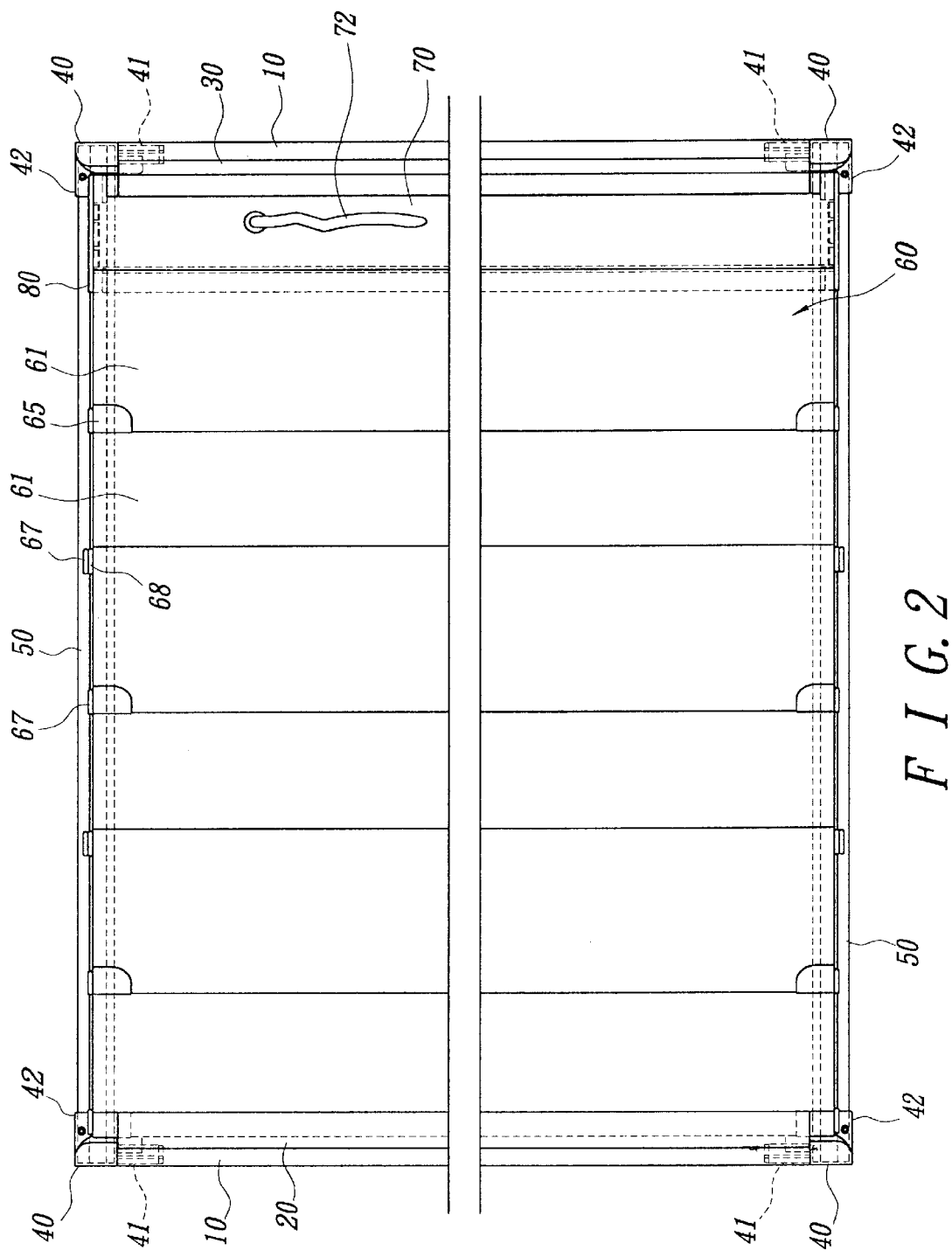
FIG. 2 is a front elevational view of the collapsible door assembly in accordance with the present invention.

Referring to FIGS. 1 through 8 and initially to FIGS. 1 and 2, a collapsible door assembly in accordance with the present invention generally includes two jambs 10, a fixing strip 20, a locking strip 30, four track-fixing members 40, upper and lower tracks 50, and a locking plate 70. It is noted that the lower (or upper) track 50 and two of the track-fixing members 40 as well as corresponding elements may be omitted without affecting the collapsibility of the door leaves 61 and operation of the locking plate 70 and the locking strip 30. Nevertheless, the lower (or upper) track 50 may provide a more stable operation for the whole collapsible door assembly in accordance with the present invention, and the invention will be hereinafter described with reference to the preferred embodiment including upper and lower tracks 50.

Figure 3:
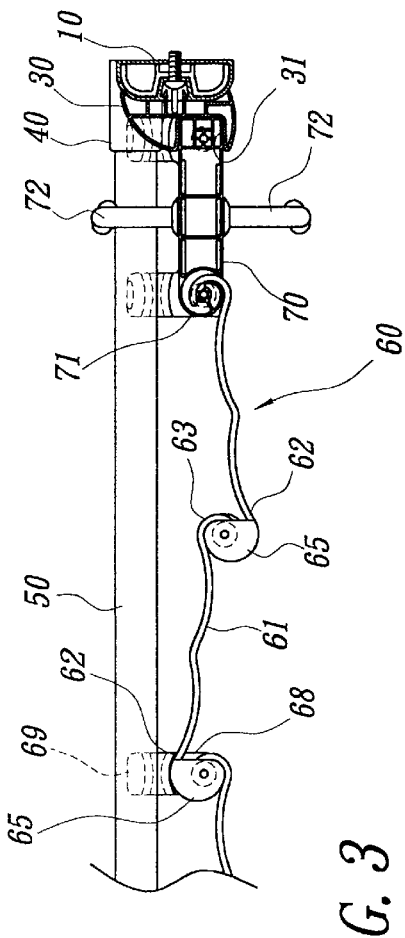
FIG. 3 is a top view, partly sectioned and partly cutaway, of the collapsible door assembly in accordance with the present invention, wherein the collapsible door assembly is in a fully extended status.
Figure 3:
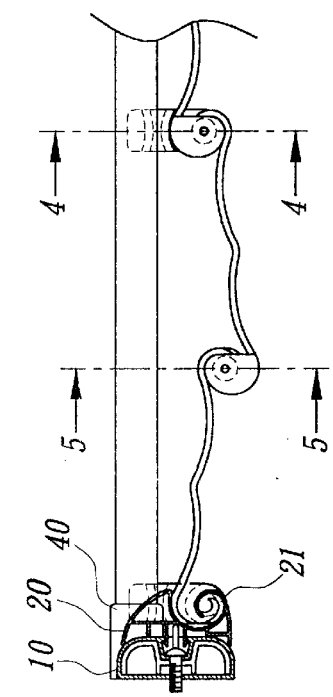

Still referring to FIGS. 1 and 2 and further to FIG. 3, the jambs 10 are respectively fixed to two opposite walls (not shown) between which the collapsible door assembly in accordance with the present invention is installed. The fixing strip 20 is secured to one of the jambs 10 (e.g., the left one) and the locking strip 30 is secured to the other jamb 10 (e.g., the right one). For each jamb 10, each of upper and lower ends of the jamb 10 has a track-fixing member 40 attached thereto, best shown in FIG. 4. In this embodiment, each track-fixing member 40 is substantially L-shape and includes a first arm 41 connected to upper end of the jamb 10 and a second arm with opening 42 for engaging with an end of an associated track 50. Thus, the upper track 50 is mounted between the two upper track-fixing members 40 and the lower track 50 is mounted between the two lower track-fixing members 40.

Figure 6:
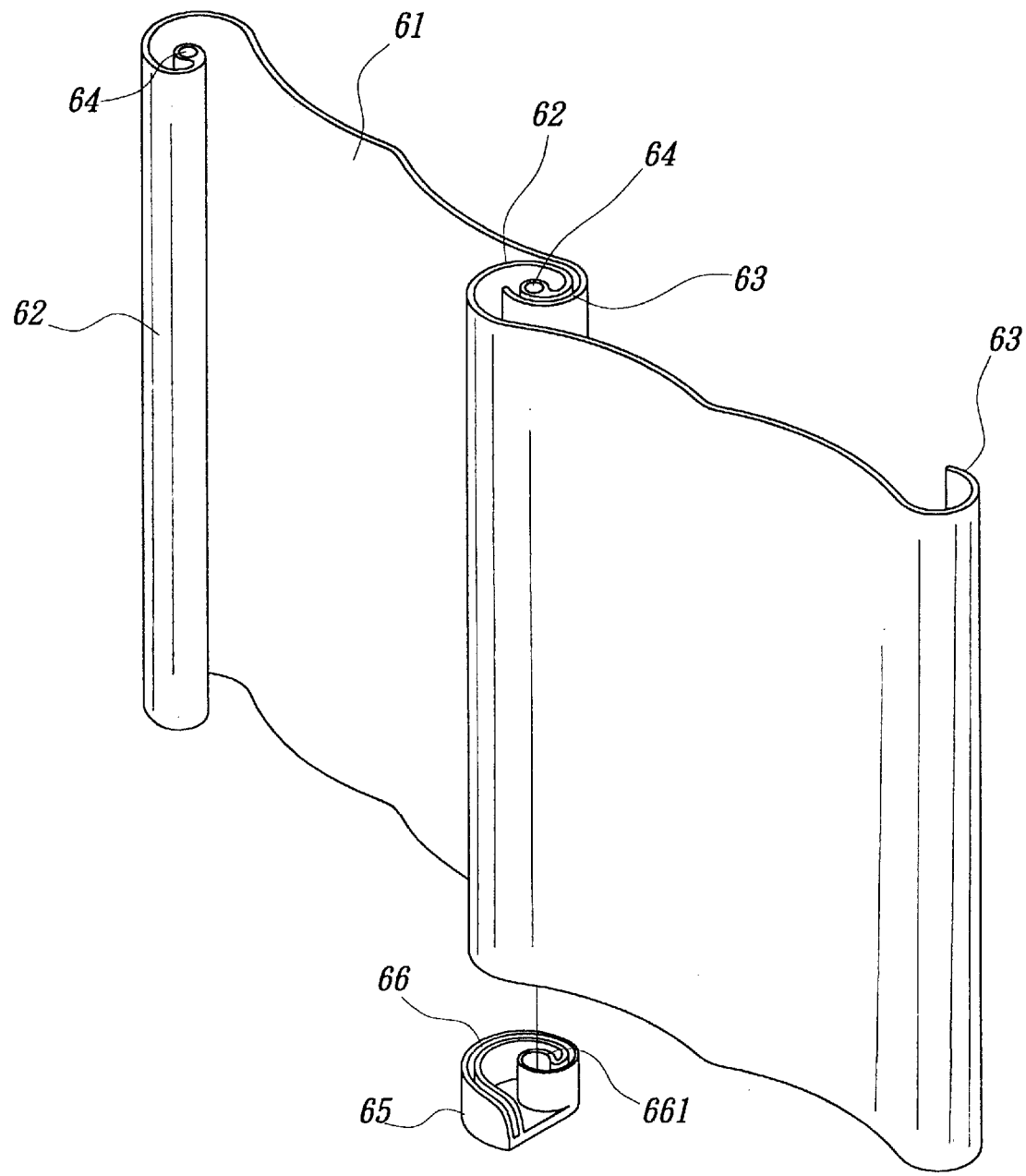
FIG. 6 is a perspective view illustrating two door leaves of the collapsible door assembly in accordance with the present invention.

Referring to FIG. 6, each door leaf 61 is substantially a plate-like member having a first end section with a swirl portion 62 and a second end section 63. The swirl portion 62 on the first end of each door leaf 61 extends along a width of the door leaf 61 and includes a through-hole 64 in an innermost end thereof. The second end section 63 of each door leaf 61 may be an arcuate portion or a swirl portion similar to swirl portion 62. The second end section 63 of each door leaf 61 is so configured that the second end section 63 of a door leaf 61 is pivotally coupled with the swirl portion 62 of the first end section of an adjacent door leaf 61, best shown in FIG. 5. Thus, the door leaves 61 may pivot one relative to the other to thereby allow collapse of the door assembly.

Referring to FIGS. 1, 2, and 6, for two pivotally connected door leaves 61, a door leaf cap 65 is mounted on top of the joint between the two pivotally connected door leaves 61 in a manner to securely connect the two door leaves 61 together yet allow the above-mentioned relative pivotal movement. Similarly, a door leaf cap 65 is mounted on a bottom of the joint between the two pivotally connected door leaves 61 in a manner to securely connect the two door leaves 61 together yet allow the above-mentioned relative pivotal movement. As illustrated in FIG. 6, each door leaf cap 65 is configured corresponding to the configuration of the swirl portion 62 of the door leaf 61 and includes a receptacle 66 for receiving the solid portion of the top (or bottom) of the joint between the two pivotally connected door leaves 61. The swirl-like receptacle 66 includes an innermost end 661 for snugly receiving an end portion of the swirl portion 62, best shown in FIG. 5. The door leaf cap 65 has a through hole 652 that has an inner end communicated with the innermost end 661 of the receptacle 66 and a countersink 651 in an outer end thereof. A positioning member 67 is mounted outside the door leaf cap 65 and a fastener 90 (e.g., a screw) is extended through the positioning member 67 into the through-hole 64 in the innermost end of one of the two door leaves 61. The positioning member 67 includes a flange 671 that is snugly received in the countersink 651 to provide a better positioning effect, best shown in FIG. 5. Referring to FIGS. 1–4, for each of odd-numbered or even-numbered joints of the door leaves 61, in addition to the door leaf cap 65 and the positioning member 67, a slide 68 is provided. Each slide 68 includes an end 69 engaged in an associated upper or lower track 50 to slide along the track 50. The other end of each slide 68 is engaged to an associated door leaf cap 65 and preferably retained between the door leaf cap 65 and the associated positioning member 67, best shown in FIG. 4. In this embodiment, the other end of each slide 68 has a hole 681 and the positioning member 67 has a bulge portion 672 extended through the hole 681 to provide a reliable positioning effect. Thus, the door leaves 61 may slide along a longitudinal direction of the tracks 50 to provide the required collapse.

Figure 7:
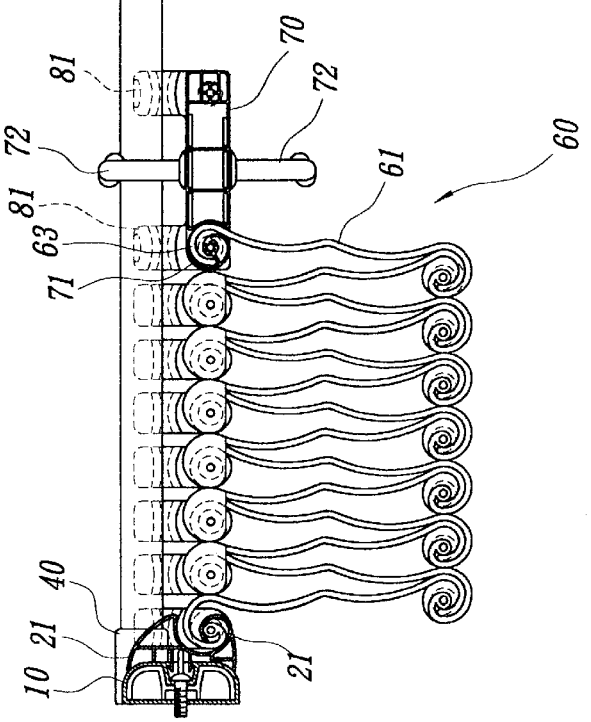
FIG. 7 is a top view similar to FIG. 3, wherein the collapsible door assembly is in a fully collapsed status.
Figure 4:
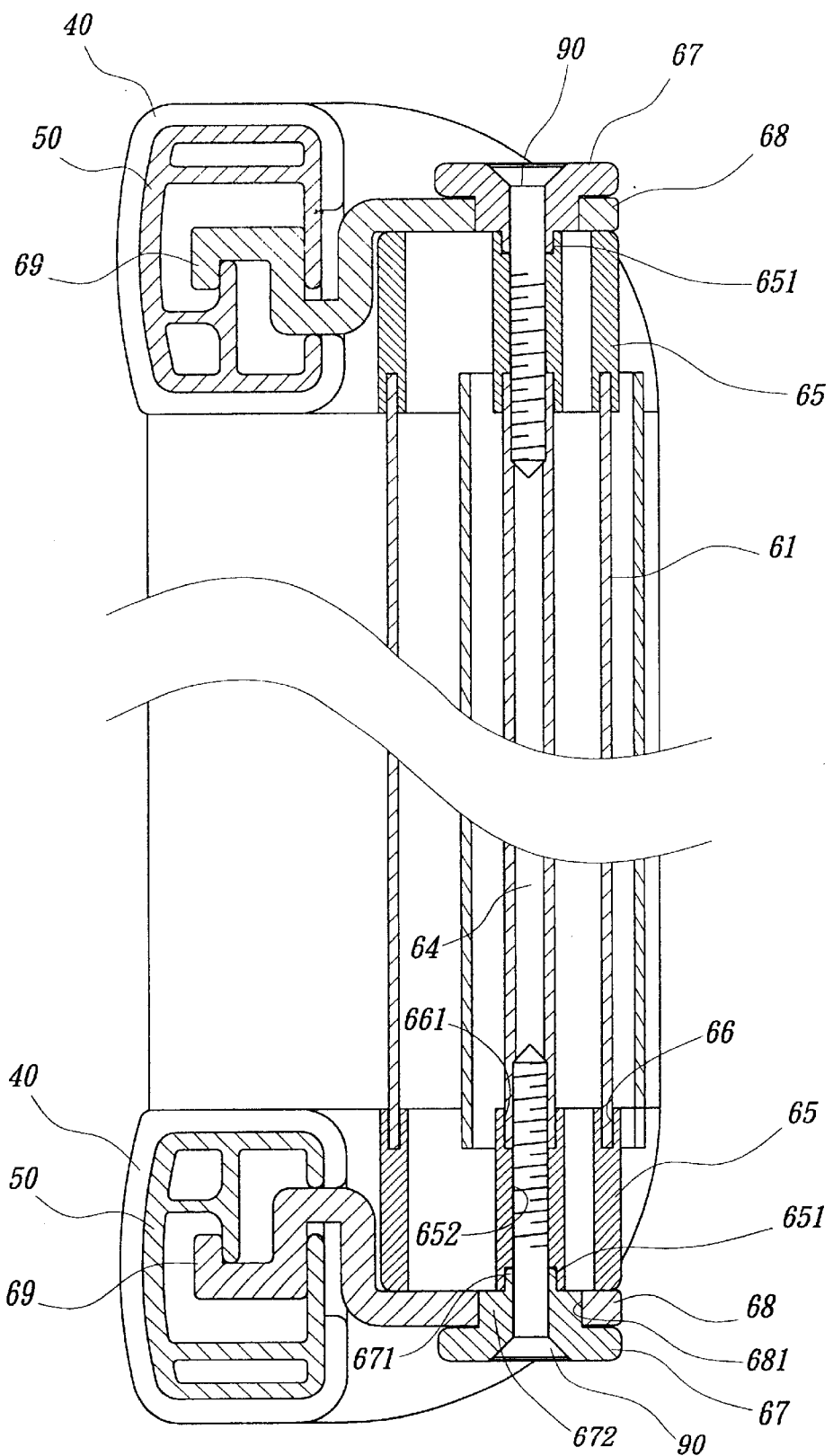
FIG. 4 is a sectional view taken along line 4—4 in FIG. 3.
Figure 8:
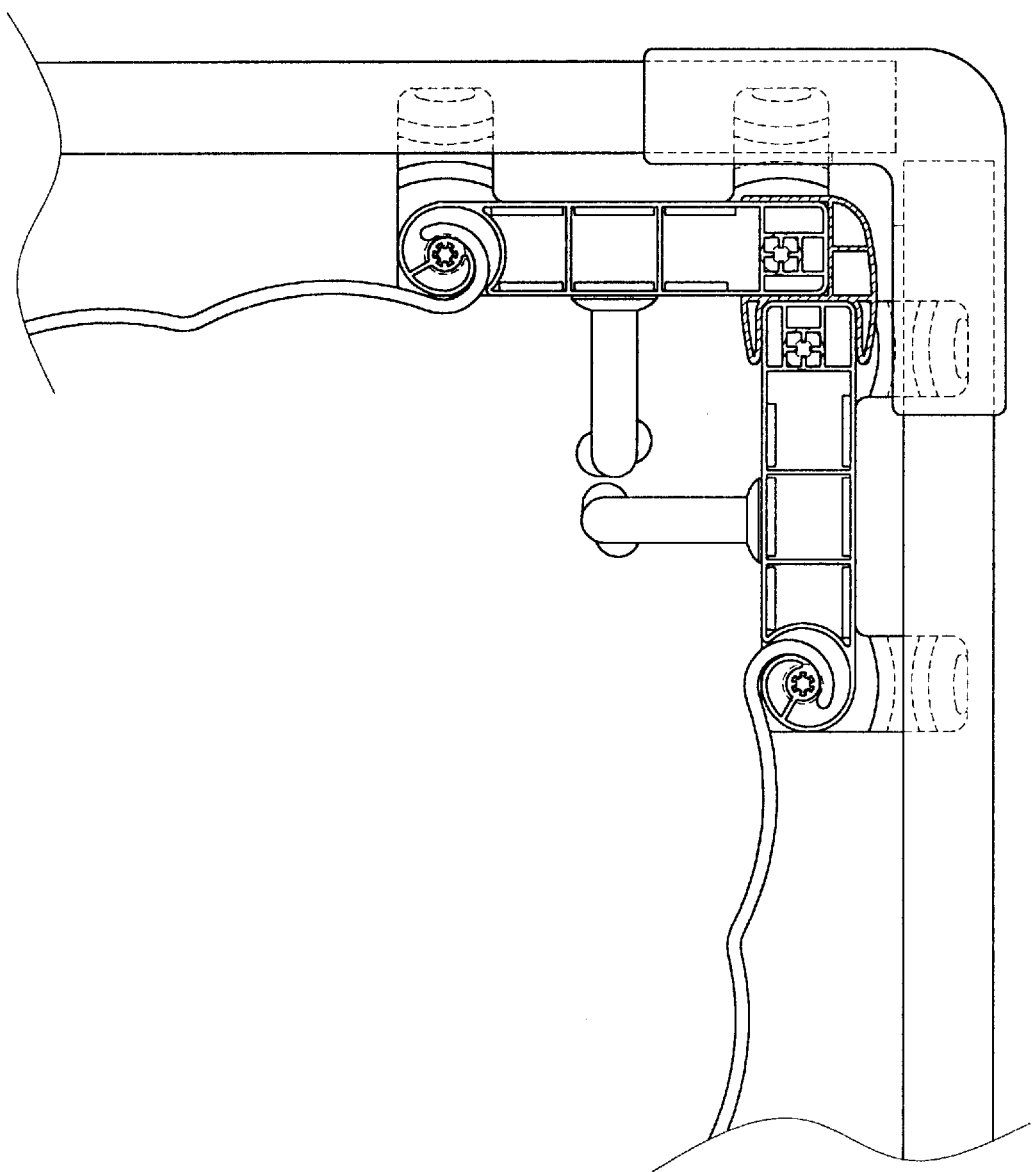
FIG. 8 is a top view illustrating an arrangement of the collapsible door assembly in a corner area.

Referring to FIGS. 1 through 3, the fixing strip 20 has an engaging portion 21 (e.g., a swirl portion) for engaging with the swirl portion 62 of the first door leaf 61 (the leftmost one in FIG. 1). The locking plate 70 includes a first end with an engaging portion 71 (e.g., a swirl portion) for engaging with the second end section 63 of the last door leaf 61 (the rightmost one in FIG. 1). A second end of the locking plate 70 is releasably engaged with an engaging groove 31 of the locking strip 30. Preferably, two handles 72 are provided to two sides of the locking plate 70, respectively. Thus, a user may grasp the handle 72 to open the door leaf assembly 60 constituted by the door leaves 61. Upper and lower caps 80 are secured to upper and lower sides of the locking plate 70 to provide an aesthetically pleasing effect. In addition, each cap is 80 may include slide members 81 mounted to and thus slidable along the associated track 50. The door assembly in FIG. 3 is closed with the door leaf assembly 60 in its fully extended status, and the door assembly in FIG. 7 is open with the door leaf assembly 60 in its fully is collapsed status. Closing and opening of the door can be easily accomplished by means of grasping the handle 72 and applying a longitudinal force. FIG. 8 illustrates application of the door assembly in a corner area.

The door leaf 61 is made of transparent or translucent material such that the light from a lamp may be transmitted into a shower space of a bathroom in which the collapsible door assembly in accordance with the present invention is installed. It is noted that connecting plates of different material and/or color required in conventional bathroom collapsible door assembly are not used in the collapsible door assembly in accordance with the present invention. Thus, the person may take a shower in a good mood, as an aesthetically pleasing effect can be obtained. The locking plate 70 and upper and lower caps 80 may be omitted, with the engaging groove 31 being configured to releasably engage with the second end section 63 of the rightmost door leaf 61 and with the handles 72 being provided on both sides of the rightmost door leaf 61. Although the collapsible door assembly in accordance with the present invention is described to be used in the bathroom, it is appreciated that it can be used in any other place whenever appropriate.

Although the invention has been explained in relation to its preferred embodiment, it is to be understood that many other possible modifications and variations can be made without departing from the spirit and scope of the invention as hereinafter claimed.

What is claimed is:

1. A collapsible door assembly comprising: a plurality of door leaves, each said door leaf including a first end section and a second end section, the first end section of each said door leaf including a swirl portion, the second end section of each said door leaf being configured to be pivotally coupled with the swirl portion of an adjacent said door leaf at a joint: a door leaf cap mounted on an end of the joint, the door leaf cap including a receptacle for receiving the end of the joint, the receptacle including an innermost end for receiving an innermost end of the swirl portion, wherein the swirl portion includes a through-hole in the innermost end thereof, the door leaf cap including a through-hole having an inner end communicated with the innermost end of the receptacles; a positioning member mounted outside the door leaf cap, and a fastener being extended through the positioning member into the through-hole of the innermost end of the swirl portion.

2. The collapsible door assembly as claimed in claim 1, wherein the through-hole of the door leaf cap further includes an outer end with a countersink, and wherein the positioning member includes a flange that is snugly received in the countersink to promote a positioning effect.

3. The collapsible door assembly as claimed in claim 2, wherein the collapsible door assembly is adapted to be mounted between two opposite walls, the collapsible door assembly comprising:
a first jamb adapted to be secured to one of the opposite walls,
a fixing strip secured to the first jamb,
a second jamb adapted to be secured to the other opposite wall,
a first track-fixing member mounted on an end of the first jamb,
a second track-fixing member mounted on an end of the second jamb, with the track being securely mounted between the first track-fixing member and the second track-fixing member, with the plurality of door leaves being mounted between the fixing strip and the second jamb, with the plurality of door leaves including first and second outermost door leaves, the first end section of the first outermost door leaf being pivotally connected with the fixing strip.

4. The collapsible door assembly as claimed in claim 3, further comprising:
a track, and
at least a first slide member including a first end securely attached to alternate joints of said plurality of door leaves, the slide member further including a second end slidably received in the track.

5. The collapsible door assembly as claimed in claim 4, wherein the first end of each said slide member includes a hole through which an associated said positioning member is extended.

6. The collapsible door assembly as claimed in claim 3, wherein the second end section of the second outermost door leaf is releasably engaged with the second jamb.

7. The collapsible door assembly as claimed in claim 6, further comprising a handle attached to the second outermost door leaf.

8. The collapsible door assembly as claimed in claim 3, further comprising a locking strip securely mounted to the second jamb, the locking strip including an engaging groove configured for releasably engaging with the second end section of the second outermost door leaf.

9. The collapsible door assembly as claimed in claim 3, further comprising a locking plate having a first end connected to the second end section of the second outermost door leaf and a second end releasably engaged with the second jamb.

10. The collapsible door assembly as claimed in claim 3, further comprising a locking plate having a first end connected to the second end section of the second outermost door leaf and a second end, a locking strip being securely mounted to the second jamb, the locking strip including an engaging groove configured for releasably engaging with the second end of the locking plate.

11. The collapsible door assembly as claimed in claim 10, wherein the locking plate includes a handle attached to a side thereof.

12. The collapsible door assembly as claimed in claim 10, wherein the locking plate includes two handles respectively attached to two sides thereof.

13. The collapsible door assembly as claimed in claim 10, wherein the locking plate includes a slide member attached thereto, the slide member having an end slidably received in the track.

14. A collapsible door assembly adapted to be mounted between two opposite walls, the collapsible door assembly comprising:
a first jamb adapted to be secured to one of the opposite walls,
a fixing strip secured to the first jamb,
a second jamb adapted to be secured to the other opposite wall,
a locking strip secured to the second jamb,
two first track-fixing members mounted on top of the first jamb and top of the second jamb, respectively,
two second track-fixing members mounted to a bottom of the first jamb and a bottom of the second jamb,
an upper track securely mounted between the first track-fixing members, a lower track securely mounted between the second track-fixing members, a locking plate including a first end and a second end, a plurality of door leaves mounted between the fixing strip and the locking strip, each said door leaf including a first end section and a second end section, the first end section of each said door leaf including a swirl portion, the second end section of each said door leaf being configured to be pivotally coupled with the swirl portion of an adjacent said door leaf at a joint having upper and lower ends, the plurality of door leaves including first and second outermost door leaves, the first end section of the first outermost door leaf being pivotally connected with the fixing strip, the second end section of the second outermost door leaf being connected to the first end of the locking plate, at least a first upper slide member including a first end securely attached to the upper end of alternate joints of said plurality of door leaves, each said upper slide member further including a second end slidably received in the upper track, at least a first lower slide member including a first end securely attached to the lower end of said alternate joints of said plurality of door leaves, each said lower slide member further including a second end slidably received in the lower track and a door leaf cap mounted to each of the upper and lower ends of the joints of said plurality of door leaves, the door leaf cap including a receptacle for receiving the end of the joint, the receptacle including an innermost end for receiving an innermost end of the swirl portion, wherein the swirl portion includes a through-hole in the innermost end thereof, the door leaf cap including a through-hole having an inner end communicated with the innermost end of the receptacle, a positioning member being mounted outside the door leaf cap, and a fastener being extended through the positioning member into the through-hole of the innermost end of the swirl portion.

15. The collapsible door assembly as claimed in claim 14, wherein the second end of the locking plate is releasably engaged with the locking strip.

16. The collapsible door assembly as claimed in claim 15, wherein the locking plate includes a handle attached to a side thereof.

17. The collapsible door assembly as claimed in claim 15, wherein the locking plate includes two handles respectively attached to two sides thereof.

18. The collapsible door assembly as claimed in claim 15, wherein the locking plate includes a slide member attached thereto, the slide member having an end slidably received in the track.

19. The collapsible door assembly as claimed in claim 14, wherein the through-hole of the door leaf cap further includes an outer end with a countersink, the positioning member including a flange that is snugly received in the countersink to provide a positioning effect.

20. The collapsible door assembly as claimed in claim 19, wherein the first end of each of the upper slide members and the lower slide members includes a hole through which an associated said positioning member is extended.

* * * * *